(12) United States Patent
Luneau et al.

(10) Patent No.: US 8,869,372 B2
(45) Date of Patent: Oct. 28, 2014

(54) REUSABLE TEMPORARY FASTENING DEVICE FOR PREASSEMBLING AT LEAST TWO PREVIOUSLY PERFORATED STRUCTURAL MEMBERS

(75) Inventors: Etienne Luneau, Segry (FR); Bastien Bellavia, Mereau (FR); Philippe Prot, Vignoux sur Barangeon (FR)

(73) Assignee: Lisi Aerospace (FR)

( * ) Notice: Subject to any disclaimer, the term of this patent is extended or adjusted under 35 U.S.C. 154(b) by 954 days.

(21) Appl. No.: 12/918,144

(22) PCT Filed: Feb. 13, 2009

(86) PCT No.: PCT/FR2009/000194
§ 371 (c)(1),
(2), (4) Date: Dec. 14, 2010

(87) PCT Pub. No.: WO2009/115691
PCT Pub. Date: Sep. 24, 2009

(65) Prior Publication Data
US 2011/0088242 A1   Apr. 21, 2011

(30) Foreign Application Priority Data
Feb. 19, 2008   (FR) ..................... 08 51043

(51) Int. Cl.
| | | |
|---|---|---|
| F16B 13/04 | (2006.01) | |
| B23P 19/02 | (2006.01) | |
| B23P 19/04 | (2006.01) | |
| B25B 27/00 | (2006.01) | |
| B25B 27/14 | (2006.01) | |
| B21D 39/00 | (2006.01) | |
| B23P 11/00 | (2006.01) | |
| B21J 15/42 | (2006.01) | |
| B25B 31/00 | (2006.01) | |
| F16B 19/10 | (2006.01) | |
| B21J 15/04 | (2006.01) | |

(52) U.S. Cl.
CPC ............... *B25B 31/005* (2013.01); *B21J 15/42* (2013.01); *F16B 19/109* (2013.01); *B21J 15/043* (2013.01)

USPC .............. 29/509; 29/235; 29/243.53; 29/263; 29/270; 29/278; 29/505; 29/520; 29/243.522; 269/95; 411/34; 411/38

(58) Field of Classification Search
USPC ........... 29/509, 505, 514, 520, 255, 278, 270, 29/280, 263, 235, 243.522, 243.53; 411/34, 38; 269/3, 6, 95
See application file for complete search history.

(56) References Cited

U.S. PATENT DOCUMENTS

| | | | |
|---|---|---|---|
| 4,044,591 A * | 8/1977 | Powderley | ................. 72/370.07 |
| 4,936,726 A * | 6/1990 | Medard | ........................... 411/44 |

(Continued)

FOREIGN PATENT DOCUMENTS

| | | |
|---|---|---|
| DE | 20 2006 012668 | 10/2006 |
| EP | 336 808 | 10/1989 |
| FR | 2 513 708 | 4/1983 |

OTHER PUBLICATIONS

Search Report dated Oct. 16, 2009.

*Primary Examiner* — Essama Omgba
*Assistant Examiner* — Darrell C Ford
(74) *Attorney, Agent, or Firm* — Henricks, Slavin & Holmes, LLP (57) ABSTRACT

A fastening device for preassembling structural members includes a hollow cylindrical body; a bearing ring provided at a proximal end of the hollow body and against which one of the structural members is intended to bear in a fastening position; a pulling threaded rod extending through the hollow body to be inserted into the structural members; a tightening means connected to the pulling threaded rod for maintaining the structural members against each other, the tightening means including a removable tubular end piece for mounting on a proximal threaded end of the pulling threaded rod that can be locally axially compacted under the action of a force applied on the pulling threaded rod in order to form a radial bead for sandwiching the structural members between the latter and the bearing ring; the fastening device including a sheath.

26 Claims, 5 Drawing Sheets

(56) References Cited

U.S. PATENT DOCUMENTS

| | | | |
|---|---|---|---|
| 5,035,129 A * | 7/1991 | Denham et al. | 72/21.5 |
| 7,735,209 B2 * | 6/2010 | Diehl et al. | 29/514 |
| 7,980,800 B2 * | 7/2011 | Kleinman et al. | 411/43 |
| 8,001,670 B2 * | 8/2011 | Gory | 29/524.1 |
| 8,579,567 B2 * | 11/2013 | Escarpit | 411/43 |
| 2004/0022596 A1 * | 2/2004 | Belanger | 411/34 |
| 2006/0251490 A1 * | 11/2006 | Kleinman et al. | 411/39 |
| 2006/0272140 A1 * | 12/2006 | Kang | 29/278 |
| 2008/0044252 A1 * | 2/2008 | Scheinberger et al. | 411/183 |
| 2009/0226278 A1 * | 9/2009 | Pratt | 411/34 |
| 2014/0047699 A1 * | 2/2014 | Pratt | 29/525.06 |

* cited by examiner

REUSABLE TEMPORARY FASTENING DEVICE FOR PREASSEMBLING AT LEAST TWO PREVIOUSLY PERFORATED STRUCTURAL MEMBERS

This application claims priority of PCT International Application No. PCT/FR2009/000194 filed on Feb. 13, 2009, the contents of which are incorporated herein by reference.

FIELD OF THE INVENTION

This invention relates to a reusable temporary fastening device for preassembling at least two previously perforated structural members, by accessing a single side of the structure.

BACKGROUND

Temporary fastening devices, often referred to as pin clamps, are frequently used in mechanical engineering and in particular in aircraft construction for preassembling the structural members constituting an aircraft, such as fuselage panels or wing panels, assembled onto frames, stringers, stiffeners, ribs and spars.

Devices known in the prior art generally include a hollow cylindrical body that is supported on a first side of the structural members being assembled, in which a rod/clamps unit, itself constituted from a threaded rod, at a first end of which two semi-clamps are fixed, equipped with retractable spoilers supported on the second side opposite the structural members being assembled. A nut is applied to the second threaded end of the rod and is supported on the posterior side of the hollow body.

The nut is therefore driven in rotation on the threaded rod by means of a screwing type assembly tool, which causes the retraction of the rod/clamps unit until the spoilers become supported on the opposite side of the structural members being assembled so as to anchor them firmly under a determined preload stress.

After the preassembly operations are complete, these devices can be removed by unscrewing the nut so that the rod/clamps unit is pushed back in the opposite direction and so as to enable the spoilers to be radially retracted to enable the device to be extracted from the hole perforated into the structural members.

Such temporary fastening devices are, for example, described in patents FR 2 513 708 or EP 336 808.

These devices are frequently used for preassembling metallic structural members, in particular made out of aluminium alloy with a mechanical strength capable of supporting, without undergoing any major damage, the high levels of local contact pressure exerted by the spoilers onto the weak bearing surfaces inherent to the concept of retractable clamps.

On modern aircraft, an increasing number of metallic structural members are being replaced by composite materials strengthened with fibres such as glass or carbon fibres. The multilayer structure of these materials makes them sensitive to delamination between layers. This form of damage, which can significantly deteriorate the mechanical strength of such materials, often occurs around a hole perforated in the composite material, in particular under high levels of local contact pressure and the sharp edges of the spoilers of the pin clamps previously described in the prior art.

SUMMARY OF THE INVENTION

One purpose of this invention is therefore to resolve the aforementioned problem using a reliable solution with a simple design.

Thus, the new pin clamp concept for composite materials described hereinafter has the precise purpose and advantage of reducing the local contact pressure to a minimum level by substantially increasing the bearing surface area and by removing the sharp edges with a blunting effect, while preserving the advantages of access via a single side of the assembly and increased installed preload, in addition to its removable and reusable character, which is particularly important.

In particular, this invention relates to a reusable temporary fastening device, such as a pin clamp, for preassembling at least two structural members previously formed with coaxial bores for receiving said device, which comprises:

a hollow cylindrical body extending along an elongation axis, a bearing ring provided at a proximal end of the hollow body and against which one of the structural members is intended to bear in a fastening position of the device, a pulling threaded rod extending through the hollow body and coaxial thereto, and to be inserted into the respective coaxial bores of the structural members to be attached, a tightening means connected to the pulling threaded rod, for maintaining the structural members against each other, wherein the tightening means includes at least one removable tubular end piece adapted to be mounted on a proximal threaded end of the pulling rod and can be locally axially compacted under the action of a force applied on said pulling rod in order to form a radial bead for sandwiching the structural members between the latter and the bearing ring, characterised in that the device comprises a sheath having a bearing ledge on which the tubular end piece bears, and enabling the formation of the radial bead at a distance from the structural members.

Thus, the deformable end piece that opens out in the shape of a bulb during installation on the structure forms a significant bearing surface enabling the levels of local contact pressure on the composite material to be reduced, while avoiding the formation of any sharp edge capable of damaging the latter. This end piece is can be easily separated after installation so as to easily remove the pin clamp. This end piece is a consumable and can be replaced so as to reuse the pin clamp at a low cost.

According to the preferred embodiments, the device according to this invention can also include at least one of the following characteristics:

the tubular end piece is locally fitted with a mechanically weakened area for forming the bead under the axial pulling force exerted on the rod;

the mechanically weakened area is defined by a reduction in thickness of the tubular end piece adapted to be radially deformed outwards, at a determined distance from the bearing ring of more than the thickness of the structural members being assembled, so as to form a bead via enlargement;

the sheath is cylindrical and screwed onto the proximal end of the pulling rod;

the sheath has an axial internal bore, polygonal in shape, for example a hexagon, adapted to work in close collaboration with a corresponding polygonal shape made on an outer distal portion of the tubular end piece so as to lock the latter in rotation with respect to said sheath;

the sheath has an outer diameter substantially equal to the outer diameter of the tubular end piece;

the sheath has, over the majority of its length, an outer diameter adapted for sliding with minimal clearance within a circular orifice made in the bearing ring;

the sheath is fitted with a shoulder intended to be supported on the inner side of the end piece of the ring, said shoulder being itself perforated with multiple radial orifices enabling the housing of a system for locking the sheath in translation with regard to the pulling rod;

the translation locking system comprises balls working with a ring-shaped groove made within the threaded rod and with a diameter equal to the outer diameter of the sheath reduced by approximately once the diameter of the balls so that the balls can retract within the groove without exceeding said diameter;

alternatively, the translation locking system is comprised from a split ring connected to the sheath and comprising multiple segments separated by divisions so as to form radially elastic splines, the ends of which having pseudo-toric shaped radial outgrowths capable of retracting into the circular channel;

the ring-shaped groove has, on its distal edge, a conical chamfer for guiding the radial movement of the balls or the ends of the split ring during their entrance/exit from said groove under axial displacement of the pulling rod;

the tubular end piece has a closed proximal end and an inner thread for working with an outer thread produced on the proximal end of the pulling rod;

the tubular end piece has, at its open end, an outer chamfer for working with a corresponding conical chamfer fitted at the proximal end of the sheath;

the device also comprises a screwing driver mounted at the distal end of the pulling rod so as to slide the pulling rod axially, in particular during the formation of the radial bead;

the driver is comprised from a hollow cylindrical part perforated through and through with an axial orifice equipped, at a proximal end, with an inner thread for working with an outer thread of the pulling rod;

the axial orifice of the driver also comprises an inner shoulder with a larger diameter than the diameter of the thread so as to act as a bearing surface to a stop screw set within a threaded inner orifice made in the pulling rod at its distal end;

the axial orifice of the driver forms, at its distal end, a cylindrical bore whose inner diameter is larger than the diameter of the inner thread so that the locking screw can be inserted by this housing;

the hollow body has, at its proximal end, an outer thread working with an inner thread of the bearing ring;

the hollow body comprises, near to its proximal end, an inner recess with a radiating base;

the hollow body comprises, near to its proximal end, a cylindrical inner recess with a flat base and suitable for receiving a removable interchangeable wearing ring with a radiating base;

the device comprises sealing means born by the bearing ring, for example an O-ring housed within an inner ring-shaped groove;

the device comprises, within the hollow body, a compressible member acting as a compression spring;

the compressible member is comprised from multiple coaxial elastic washers, for example Belleville washers, intended to be compressed under an axial preload induced during the device installation phase on the structural members being assembled; and the elastic washers become supported against an inner shoulder of the hollow body on the one hand, and the proximal end of the driver on the other hand.

The invention also relates to a temporary fastening method for preassembling at least two structural members previously formed with coaxial bores and implementing a device according to any one of the previous claims, characterised in that it comprises the following steps of:

producing tightening means for tightening the structural members in the form of a radial bead, at a distance from said members, in particular bores, then bringing the bead into contact with said members.

Preferably, the bead is produced on a tubular end piece adapted to be mounted in a removable manner onto a pulling rod of the device and equipped with a mechanically weakened area, becoming radially deformed by enlargement to form said bead.

BRIEF DESCRIPTION OF THE DRAWINGS

The invention will now be described in more detail with reference to the particular embodiments given for illustration purposes only and represented in the appended figures, in which.

DETAILED DESCRIPTION

Figure 1:
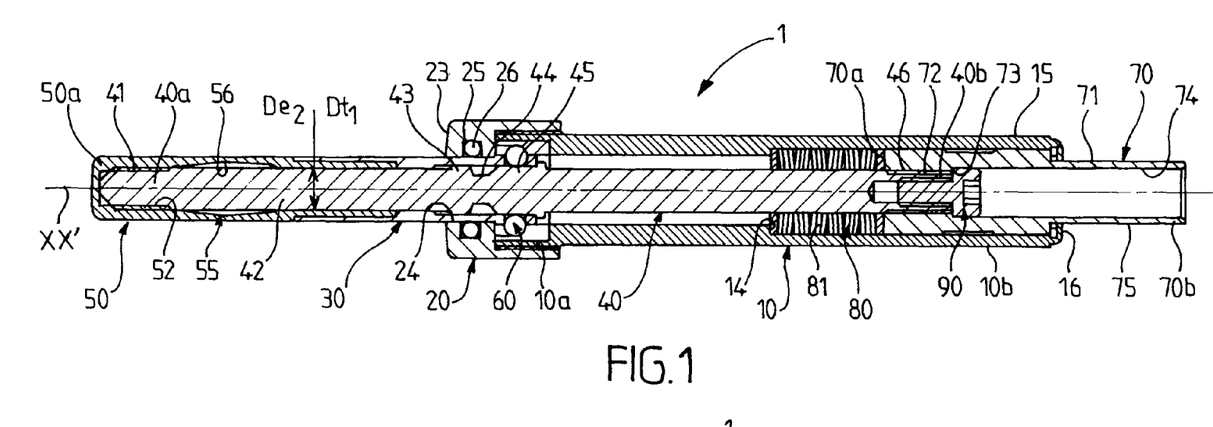
FIG. 1 is a cross-sectional view of a temporary fastening device of this invention in its initial state with an end piece.
Figure 2:
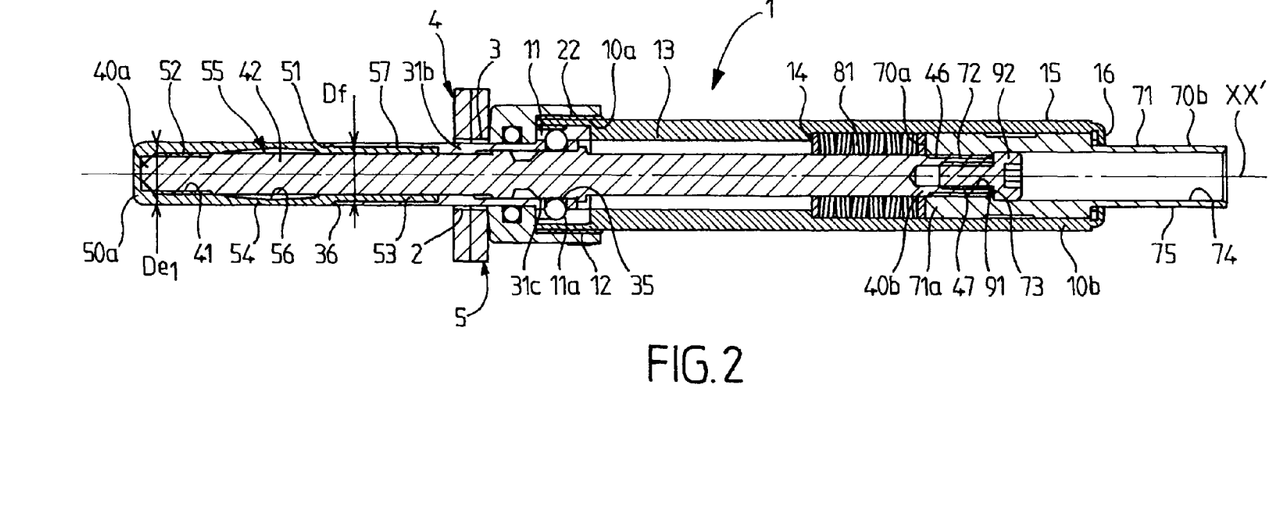
FIG. 2 is a cross-sectional view of the device mounted through structural members being assembled.
Figure 3:
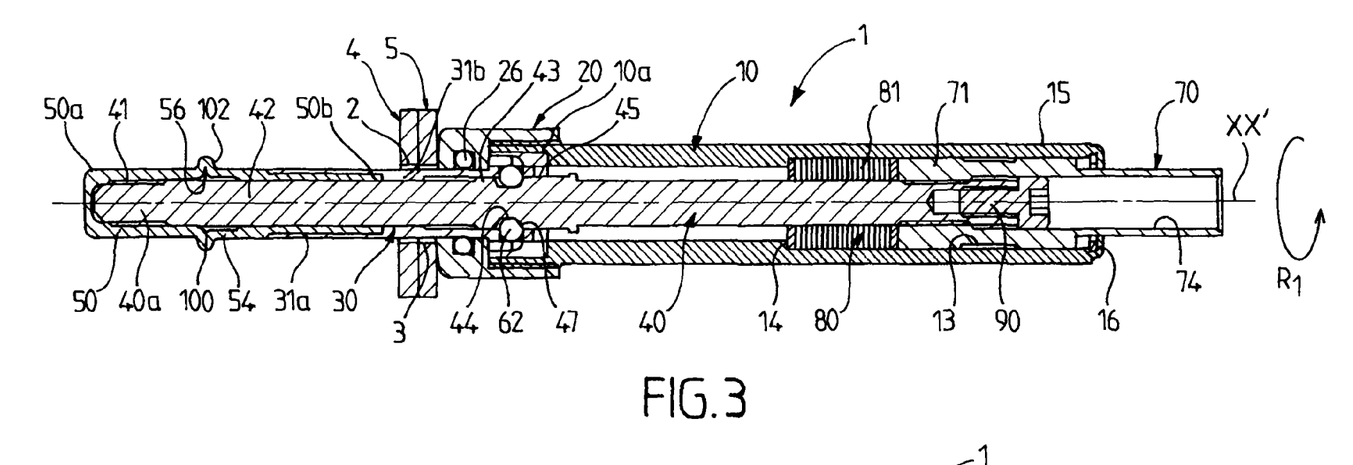
FIG. 3 is a cross-sectional view of the device illustrating a first step in the formation of a tightening bead on the end piece.
Figure 4:
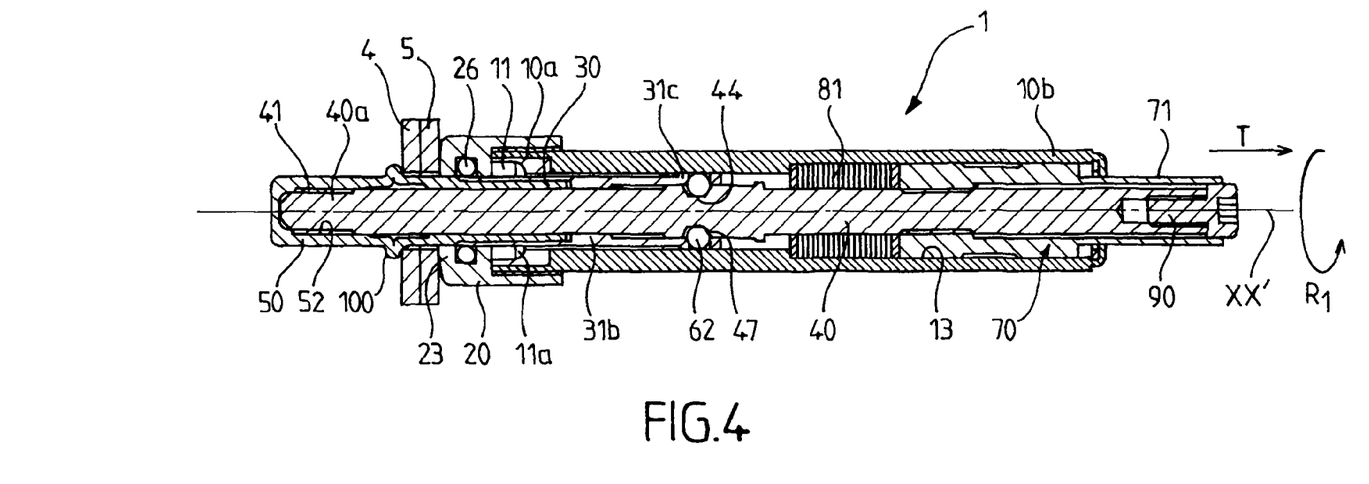
FIG. 4 is a cross-sectional view of the device illustrating a second step in tightening the structural members using said bead.
Figure 7:
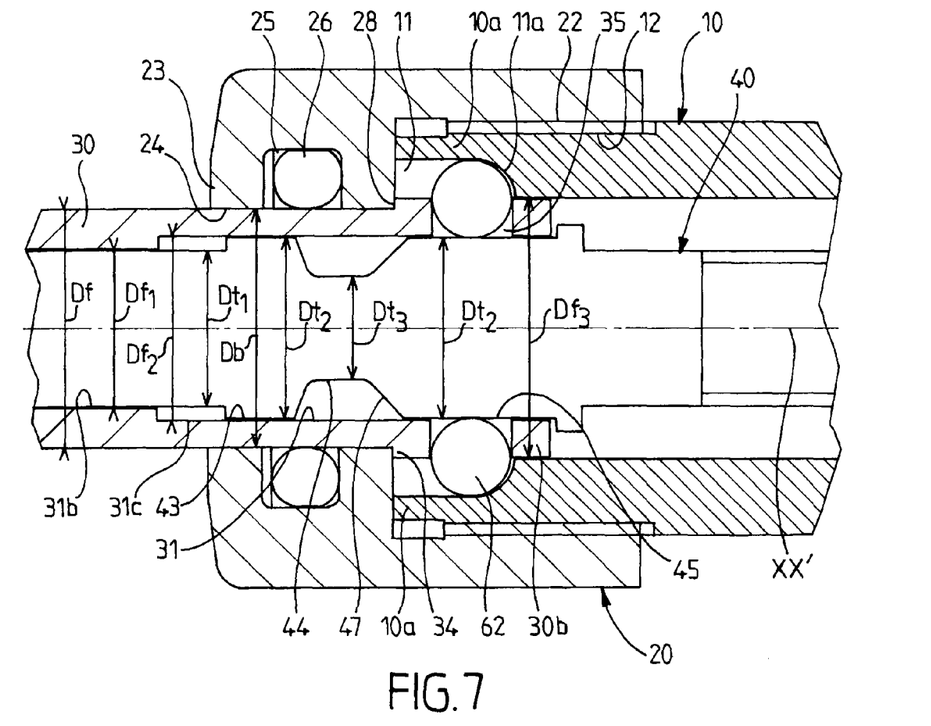
FIG. 7 is a magnified cross-sectional view of a proximal section of the device of this invention.

The pin clamp 1 according to this invention is represented in a cross-sectional view in FIG. 1 in its configuration as ready to be inserted into the coaxial orifices 2 and 3 previously perforated in a structure comprised of at least two members 4 and 5 being assembled, such as aircraft plates. FIGS. 2 to 6 illustrate the different steps for using this pin clamp, which comprises the following members:

A hollow cylindrical body 10 extending along an axis of symmetry XX'. The hollow body 10 comprises, at a proximal end 10a, an inner recess 11 with a base, in the example given in FIG. 7, with a radiating connection 11a intended for receiving a translation locking system 60 described hereinafter. In the example given in FIGS. 1 to 6, the inner recess 11 is cylindrical with a flat base for receiving a removable and interchangeable wearing ring 11b. Typically, this ring 11b is made out of a metallic material with a strength level of between 1,300 MPa and 1,500 MPa. The ring 11b has the same radiating base 11a as that of the inner recess 11 in FIG. 7. An outer proximal thread 12 is also fitted onto the periphery of the hollow body 10 so as to attach a bearing ring 20 described hereinafter. The distal end 10b of the hollow body 10 comprises a smooth bore 13 and a shoulder 14 for receiving a driver 70 and an elastic compression member 80, which will be described hereinafter. The hollow body 10 has an outer polygonal section 15 at its distal end 10b, for example a hexagon, for receiving tooling such as a flat key or suitable screw gun. For practical reasons involving the mounting of the components of the pin clamp and for maintaining these within the hollow body 10, the diameter of the latter is reduced at the location of its distal end 10b by folding down and beading an initial tubular portion 16, after installation of the components described hereinafter;

A bearing ring 20 forming a blanking plug fitted with an inner thread 22, for working with the proximal outer thread 12 of the hollow cylindrical body 10, and a bearing surface 23 perforated with a coaxial orifice 24 with a diameter Db substantially equal to that of the bores 2 and 3 respectively made within the thickness of the structural members 4 and 5 being assembled. The bearing ring 20 also has an inner groove 25 for receiving an O-ring 26 acting as sealing means with a sheath 30 described hereinafter. Ring 20, once screwed onto the hollow body 10, comes to a stop at the proximal end 10a of the latter;

A tubular sheath 30 equipped with an axial through-bore 31 comprised from a proximal portion 31a comprising a polygonal inner section, for example a hexagon, adapted to receive a coupling 50 with a complementary shape described hereinafter, a median portion 31b with a smooth bore with a diameter Df1, and a distal portion 31c with a smooth bore with a diameter Df2, larger than diameter Df1 (refer to FIG. 7). The sheath 30 also has, along its proximal 31a and median 31b portions, an outer diameter Df adapted for sliding with minimal clearance within the circular orifice 24 made in the side 23 of the bearing ring 20. The portion of outer diameter Df extends axially towards the distal end 31c of the sheath 30, by means of a radial shoulder 34 intended to be supported by an inner side 28 of the ring 20, said shoulder 34 being itself perforated with multiple radial orifices 35 housing the locking system 60 for balls 62. The radial shoulder 34 has a hexagonal outer shape that works with a complementary shape made along the smooth part 13 of the hollow body 10 so as to prevent rotation of the rod 40. Moreover, the sheath 20 is fitted at its proximal end 31a with a conical chamfer 36 forming a bearing ledge, against which the tubular end piece 50 bears;

An axial pulling rod 40 presenting successively, from its proximal end 40a, an outer thread 41 for working with the end piece 50, a first cylindrical portion 42 with a calibrated diameter Dt1 adapted for sliding with minimal clearance in the median portion 31 b of the tubular sheath 30, a second cylindrical portion 43 with a diameter Dt2 larger than diameter Dt1, a ring-shaped groove 44, for which the shape and dimensional details are described hereinafter, a third cylindrical portion 45 with the same diameter Dt2 as that of the second cylindrical portion 43, a fourth cylindrical portion located at its distal end 40b and presenting an outer thread 46 for receiving a driver 70 and an inner thread 47 for receiving a stop screw 90. As shown in FIG. 7, the ring-shaped groove 44 has a diameter Dt3 lower than diameters Dt1 and Dt2. More precisely, diameter Dt3 is substantially equal to the outer diameter Df3 of the sheath 30 at its distal end, reduced by approximately once the diameter of the balls 62 so that the balls can retract within the groove 44 without exceeding said diameter Df3, the reduced diameter Dt3 being connected to the third cylindrical portion 45 by an appropriate conical chamfer 47. This groove 44 is located at a predefined distance from the proximal end 40a of the pulling rod 40;

A removable tubular end piece 50 closed at a proximal end 50a, whose outer diameter De1 is identical to the outer diameter Df of the tubular sheath 30 (FIG. 1) so as to end with a chamfered bearing side 51 intended to bear on the chamfered bearing side 36 of the sheath. The end piece 50 has three successive inner portions, i.e., at the closed proximal end 50a, an inner thread 52 for working with the outer thread 41 of the pulling rod 40; at the distal end 50b, a portion 53 with an inner diameter De2 adapted for sliding with minimal clearance on the first cylindrical portion 42 with a diameter Dt1 of the pulling rod 40; and a median portion 54 with a mechanically weakened area 55 presenting, in the form of a localised reduction 56 in the thickness of the wall of the end piece 50 intended to be subjected to plastic deformation as described hereinafter under an axial compression stress. The local reduction in diameter 56 is connected to the two proximal and distal portions by two shallow sloped chamfers so as to ensure the progressive variation in the strains applied by application of said axial stress. The outer surface of the end piece 50 has, at its distal end 50b, after the chamfered bearing side 51, a polygonal shape 57, for example a hexagon, working with the polygonal shape 31a of the aforementioned tubular sheath, said polygonal shapes enabling the removable end piece 50 to be immobilised in rotation during the screwing and unscrewing phases of driver 70;

A system 60 for locking the sheath/end piece unit in translation, operating after a bead 100 has been formed at the mechanically weakened area, as described hereinafter in relation to FIGS. 2 and 3, this system comprising a series of balls 62 intended to be housed within or outside of the groove 44 of the pulling rod 40;

A driver 70 comprised from a hollow cylindrical part 71 axially perforated through and through by a cylindrical orifice. The driver 70 is equipped, at a proximal end 70a, with an inner thread 72 for working with the outer thread 46 of the pulling rod 40 in addition to a shoulder 73 with an increased outer diameter to act as a stop for a head of the stop screw 90. The shoulder 73 extends axially towards the distal end 70b of the driver, by a cylindrical bore 74 with a larger inner diameter than the diameter of the inner thread 72. Externally, the driver 70 comprises a polygonal driving shape 75, for example a hexagon, for receiving suitable tooling such as a key or screw gun;

A compressible member forming a compression spring 80, comprised from multiple Belleville-type coaxial elastic washers 81 with raised stiffness, intended to be compressed under the axial preload induced during the installation phase on the structural members being assembled. These washers 81 are maintained around the pulling rod 40, within the hollow body 10, between the shoulder 14 of the latter and the proximal end 70a of the driver 70; and A stop screw 90 with a threaded portion 91 for being inserted into the inner thread 47 of the pulling rod 40 and a head 92 with an outer diameter slightly smaller than the inner diameter of the cylindrical bore 74 made in the driver 70, said head 92 having a key inset shape, for example a hollow hexagonal inset. This stop screw 90 is tightened then bonded within the inner thread 47 of the pulling rod 40 during assembly of the components of pin clamp 1. It acts both as a rear stop to avoid the driver 70 from escaping from the pulling rod 40 when in use, and also as a means for driving the pulling rod 40 in rotation as described hereinafter in the operation section.

DESCRIPTION OF OPERATION

As shown in FIG. 1, the initial state before introduction of clamp 1 into bores 2 and 3 previously made in the structural members being assembled 4 and 5, the removable end piece 50 is positioned at the end of the tubular sheath 30 so that the outer polygonal shape 57 of the end piece 50 is inserted into the inner polygonal shape 31*a* of the sheath 30, so as to immobilise the end piece in rotation.

Thread 41 of the pulling rod 40 is thus screwed into the inner thread 52 of the removable end piece 50 using a key connecting with the hollow head 92 of the stop screw 90.

In this position, the balls 62 positioned in the radial orifices 35 perforated into the sheath 30 are maintained in a "radially deployed" position due to the presence of the cylindrical portion 45 with a diameter Dt2 of the pulling rod 40 but also being supported by the radiating base 11*a*. In this position, the balls 62 prevent any relative translation movement of the sheath 30 within the hollow body 10. As the balls 62 are supported by and rub against the radiating base 11*a* to compensate for the axial stress for forming the bulb, the base 11*a* wears during each use. This is why, in the example of embodiment of the device according to the invention in FIGS. 1 to 6, the removable wearing ring 11*b* is to be changed as required so as to ensure the optimal and sustainable operation of said device. In order to achieve this, the bearing ring 20 is simply unscrewed to extract the worn removable ring 11*b* and replace it with a new removable ring 11*b*, after which the bearing ring 20 is then screwed back in place.

Moreover, the driver 70 is inserted on the end part of the thread 47 located at the end of the pulling rod 40. In this initial configuration, the pin clamp 1 can be freely inserted into bores 2 and 3 of the structural members being assembled 4 and 5 so that the bearing side 23 of the ring 20 enters into contact with the first side 5 of the structural members (FIG. 2).

Using a screw gun or any other screwing means, the driver 70 is rotated (arrow R1 in FIG. 3) with respect to the hollow body 10 maintained immobile by means of the outer key inset 15.

The rotation of the driver 70 in the screwing direction causes the pulling rod 40 to be moved in translation via the threaded connection between these two parts. The pulling rod 40, which is itself screwed into the inner thread 52 of the removable end piece 50, exerts an increasing traction stress on the latter whereas said end piece 50 is locked in a position supported by the end side of the sheath 30 via chamfers 51 and 36.

Under this increasing stress, the median portion 54 with a reduced thickness 56 of the end piece 50 begins to undergo radial deformation by buckling. The pulling action T of the rod 40 continues (arrow R1 in FIG. 3, then in FIG. 4) until the bead 100 thus created in the median portion 54 of the end piece 50 flattens completely. In this position, the ring-shaped groove 44 made in the intermediary portion of the pulling rod 40 becomes positioned level with the balls 62, which can thus retract in the ring-shaped groove 44 and release the sheath 40.

In order to perform this stage of the operation, the ring-shaped groove 44 must therefore be positioned at a determined distance from the threaded end 41 of the pulling rod 40 such as the axial distance required to fully flatten the bead 100 and bring this groove level with the recess 11 with a radiating base 11*a* and with balls 62 housed in the tubular sheath 30.

The action from the rotation of the driver 70 being maintained (arrow R1 in FIG. 4), the rod/sheath/end piece unit continues its withdrawal in translation on the one hand within the hollow body 10 and on the other hand within bores 2 and 3 of the structural members 4 and 5 until the bearing side 102 of the bead 100 enters into contact with the second side of the structural members being assembled 4 and 5.

The spring device 80 is thus progressively compressed between the shoulder 14 of the hollow body 10 and the inner bearing side comprised from the proximal end 70*a* of the driver 70, under a determined axial stress inducing an equal anchoring stress for the structural members.

The screwing means used is equipped with an integrated dynamometric disengaging system activated under a predetermined torque so that the rotation and load under axial stress stop when the desired anchoring stress is reached.

The presence of the compressible spring device 80 enables a raised anchoring stress level to be maintained, even if a mechanical relaxation of the anchoring is produced, in particular under the creep of interposition fillers or resins.

Figure 5:
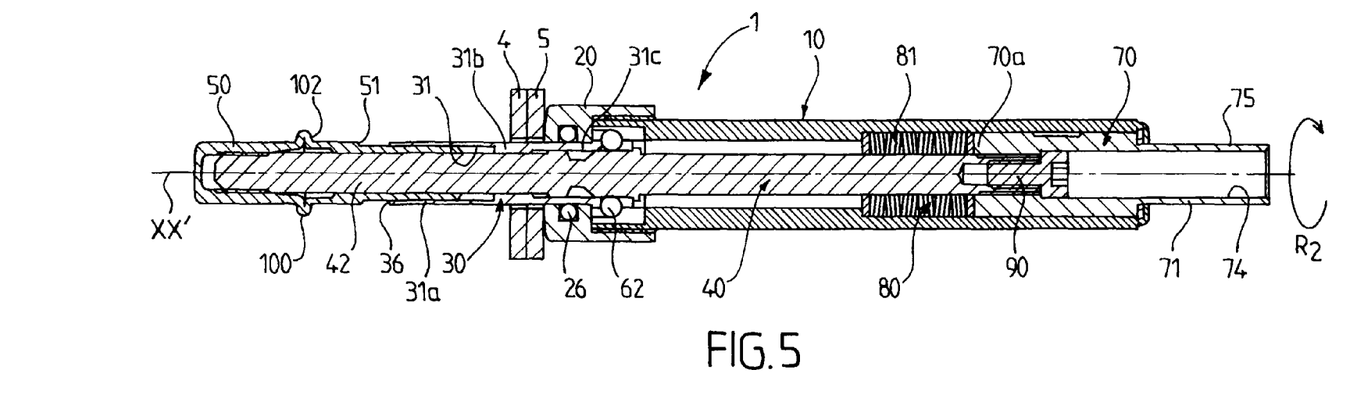
FIG. 5 is a cross-sectional view of the device illustrating a third step of releasing the structural members by reversing the bead.
Figure 6:
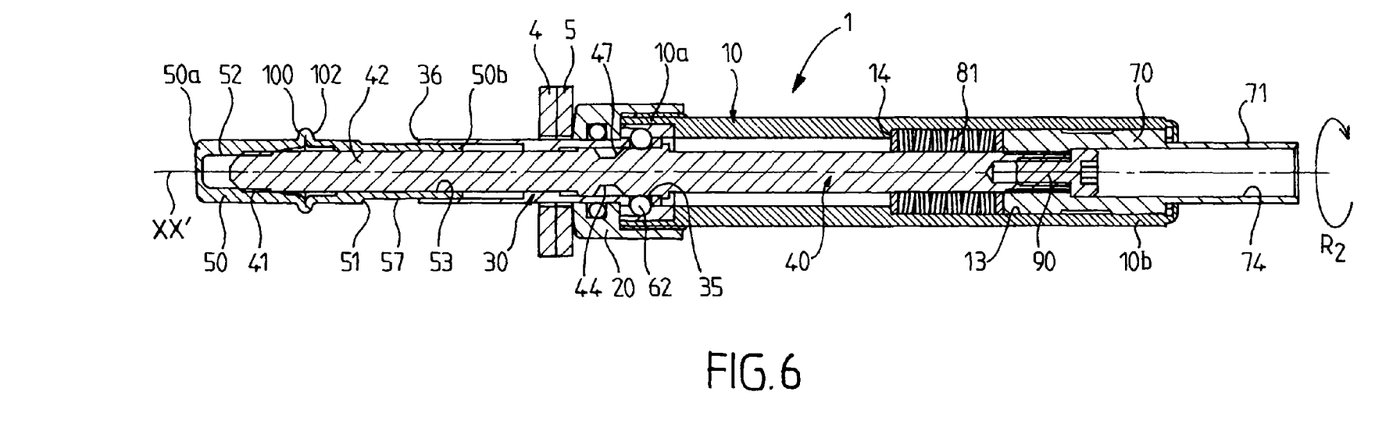
FIG. 6 is a cross-sectional view of the device illustrating a fourth step of ejecting the end piece.

After consolidation of the assembly, for example after creep and polymerisation of the fillers of resins, the pin clamp can be easily positioned by unscrewing the driver 70 (arrow R2 in FIGS. 5 and 6). The pulling rod 40 therefore becomes pushed back towards its initial position before installation, until the balls 62 take back their deployed position in the recess 11 at the front of the hollow body 10, and until the bearing side of the head 92 of the stop screw 90 becomes blocked on the shoulder 73 of the driver 70.

At this stage, the rotation of the driver 70 causes the rotation of the rod 40, whose inner thread 41 becomes unscrewed in the outer thread 52 of the end piece 50 as the latter is immobilised in rotation by the respective hexagonal shapes 57 and 31*a* of said end piece and of the shaft 30, which is itself immobilised in rotation within the hollow body 10. The unscrewing action is continued until the inner thread 52 of the end piece 50 becomes disconnected from the outer thread 41 of the pulling rod 40.

The operator can thus extract the pin clamp from bores 2 and 3. Pin clamp 1 can then be reused by simply replacing the deformed end piece 50 with a new end piece.

It should be noted that under the axial compression stress exerted during installation, the conical end sides 51 and 36 of the end piece and of the sheath are maintained in close contact with each other so that the interface is sealed against the penetration of any resins or fillers within the pin clamp, capable of blocking the mechanism and preventing the pin clamp from being removed without destruction.

Moreover, the sealing between the outer diameter Df of the sheath 30 and the inner diameter Db of the bearing ring 20 is strengthened by adding the O-ring 26 housed within the inner groove 25.

The end piece 50 thus remains easily separable from the sheath 30 and its simple replacement with a new end piece prevents the need for resorting to time consuming and costly cleaning operations for the pin clamps before reuse, as is required for standard pin clamps equipped with retractable clamps, in which resins and fillers infiltrate.

The originality of the pin clamp in compliance with this invention requires that firstly, due to the inner design of the end piece 50, the radial enlargement of the bead 100 be initiated at a large enough distance from the structural members being assembled, enabling the stop of bore 2 to be protected from any radial expansion strain capable of damaging said structural members. This particularity results from the fact that the deformable tubular end piece 50 constitutes a member that is independent from the sheath 30 and that it is fully located away from bores 2 and 3 of the structural members 4 and 5 during the entire flaring and enlargement phase for the bead 100. Secondly, the end piece/sheath unit is drawn by the pulling rod 40 within bores 2 and 3 of the structural members 4 and 5 until the bearing side 102 of the bead 100 enters into contact with the opposite side of said members and exerts a predetermined anchoring stress on the latter in collaboration with the bearing ring.

These two steps automatically follow one after the other during the same continued traction action of the rod (FIGS. 3 and 4), the passing of the bead 100 formation step to the anchoring step being initiated by the movement of the circular channel 44 of the rod 40 that becomes positioned level with the base of the recess of the hollow body, whereas the balls 62 become retracted in the circular channel. The sheath 30 no longer being retained by the balls 62 can thus slide and retract within bores 2 and 3 until the bearing side of the bead 102 enters into contact with the opposite side of the structural members. This operating principle based on two successive steps automatically following one after the other, controlled by the movement of the balls 62, does not exist in any other blind fastener system.

Another advantageous characteristic of this pin clamp resides in the fact that the deformable end piece 50 is removable and interchangeable. Moreover, it is closed at one end 50a and has an outer conical chamfer 51 at the other end, which is supported on the conical chamfer 36 of the tubular sheath 30. Thus, under the axial compression stress applied during installation, these two chamfers are maintained in close contact, sealing the end piece/sheath interface against penetration of any resins or fillers within the pin clamp, which could block the mechanism after polymerisation. Thus, the pin clamp can then be easily removed by an unscrewing action, which pushes the pulling rod and the end piece/sheath unit back until it disconnects with the outer thread 41 of the pulling rod 40. The pin clamp can thus be easily extracted from bores 2 and 3.

Due to the fact that the polymerisable products could not penetrate into the mechanism, no costly or time consuming operations are required for cleaning/stripping the pin clamps, as is the case for standard clamp-based pin clamps. Moreover, the deformed end piece (not reusable) can easily be replaced with a new removable end piece in view of reusing the same pin clamp at a low cost.

With the end piece 50 being removable, this can be made out of various plastically deformable materials, metallic or otherwise, such as aluminium alloys, austenitic stainless steels, nickel or titanium alloys or even some elastomers materials, so that the bead 100 formation stress in addition to its mechanical strength can be adjusted according to the desired level of anchoring stress.

Another interesting aspect of the pin clamp resides in the fact that the removable end piece 50 and the sheath 30 are immobilised in rotation with regard to each other by a polygonal mechanical coupling, for example a hexagon. Thus, when the deformable end piece 50 enlarges in its median portion 54 to form the bead 100 and when the latter is supported on the side of the structural members, no axial rotation movement of the bead 100 is possible, thus avoiding any damage caused by friction on the structural member 4 on which the bead is supported, as may be the case with other blind fastener systems installed by screwing action. This is important, in particular for structural members made out of composite materials so as to prevent the bead from removing material (delamination) at the bores.

For the example of pin clamps with large diameters, the axial stress developed during installation can reach raised values in that the local contact pressures between the balls and the recess with a radiating base risk reaching excessive levels capable of causing matting of the contact surfaces. The variation in embodiment described hereinafter in relation to FIGS. 9 to 11 resolves this problem.

Figure 9:
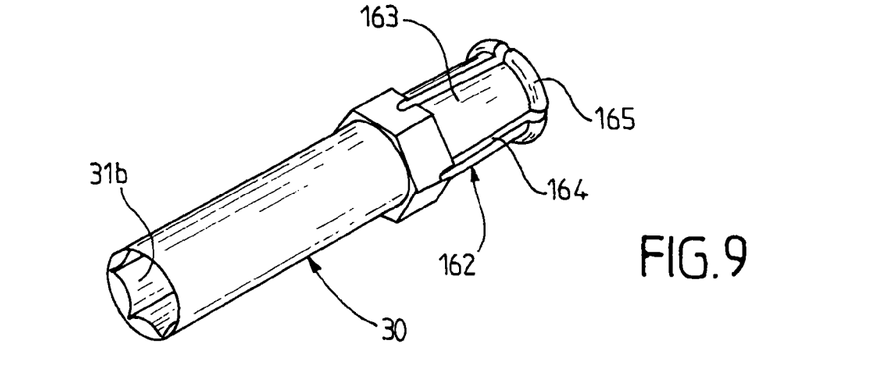
FIG. 9 is a perspective view of a variation in embodiment of one of the members of the device of this invention.
Figure 10:
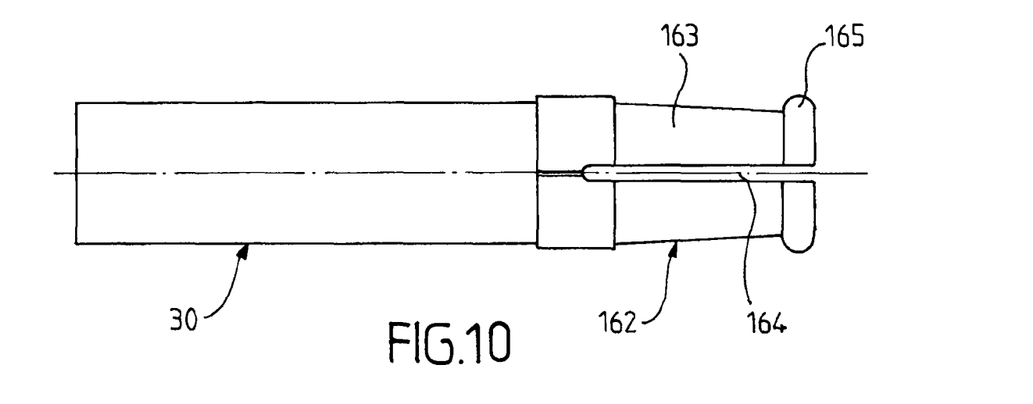
FIG. 10 is a side view of the member in FIG. 9.
Figure 11:
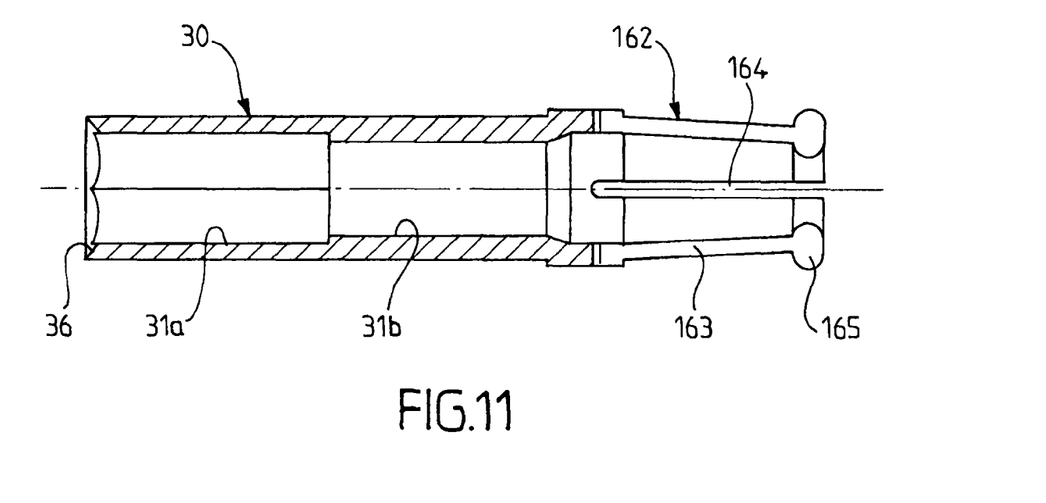
FIG. 11 is a longitudinal cross-sectional view of the member in FIG. 10.

In this variation, the balls 62 are replaced with an elastic split ring 162 connected to the sheath 30, presenting multiple segments 163 separated by divisions 164 extending along a large enough length to provide the blades thus obtained with a radial elasticity. The split ring 162 is thus capable of being radially opened to allow the second cylindrical portion of the pulling rod 40 to pass and to become supported by the radiating base of the recess 11 of the hollow body 10.

During installation of clamp 1 on the structural members being assembled 4 and 5, the pulling rod 40 moves axially during the radial enlargement of the bead 100 and the circular channel 44 becomes positioned level with the ends 165 of the segments 163, which retract in the circular channel thanks to the "spring" effect produced in the elastic blades.

Indeed, these ends 165 form bulbous outgrowths fairly similar to the balls 62 of the first embodiment as they have a pseudo-toric shape. These outgrowths thus have the same function as balls 62, i.e. to firstly allow the pulling rod 30 to slide, then to enable the end piece 50 to be driven to form the bead 100, with the advantage of considerably increasing the contact surface area so as to reduce the local pressure and avoid matting phenomena.

All other steps involved in the installation of the pin clamp and its later removal remain identical to the general description given in relation to FIGS. 1 to 8.

Figure 8:
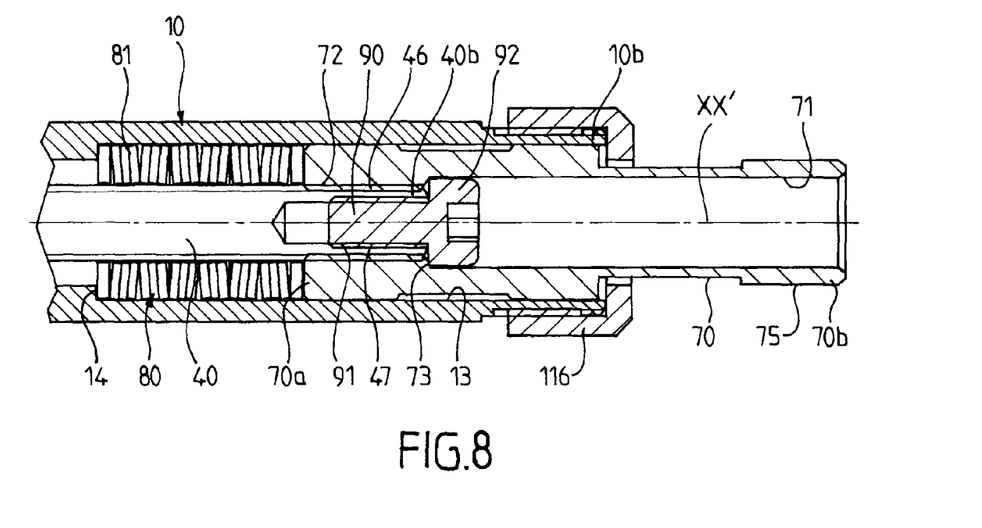
FIG. 8 is a magnified cross-sectional view of a distal section of the device of this invention.

According to another embodiment of the invention illustrated in FIG. 8, the closed part 16 that enables the different members to be locked axially within the hollow body is replaced with a nut 116 screwed onto the distal end 10b of the hollow body.

It goes without saying that the detailed description of the purpose of the invention, intended for purposes of illustration only, does in no way limit the scope of the invention with the technical equivalents being also included in the scope of this invention.

Thus, the O-ring 26 can be replaced with any other type of sealing means adapted to this type of pin clamp.

Similarly, the Belleville washers can be replaced with other compression members, for example a helicoidal spring.

The invention claimed is:

1. A reusable temporary fastening device for preassembling at least two structural members previously formed with coaxial bores for receiving said device, which comprises:
   a cylindrical hollow body extending along an elongation axis,
   a bearing ring provided at a proximal end of the hollow body and against which one of the structural members is intended to bear in a fastening position of the device,
   a reusable pulling threaded rod extending through the hollow body and coaxial thereto, and to be inserted into the respective coaxial bores of the structural members to be attached,
   a tightening means connected to the pulling threaded rod, for maintaining the structural members against each other, wherein the tightening means includes at least one removable tubular end piece adapted to be mounted on a proximal threaded end of the pulling rod, and is configured to be locally axially compacted as a result of pivoting of said pulling rod in order to form a radial bead for sandwiching the structural members between the radial bead and the bearing ring, wherein, the device comprises a sheath having a first end portion internal to the hollow body and a second end portion having a bearing ledge on which the tubular end piece bears and wherein at least one of a portion of the tubular end piece and a portion of the sheath extends inside a portion of the other, and enabling the formation of the radial bead at a distance from the structural members.

2. A device according to claim 1, in wherein the tubular end piece is locally fitted with a mechanically weakened area for forming the bead under an axial pulling force exerted on the pulling threaded rod.

3. A device according to claim 2, wherein the mechanically weakened area is defined by a reduction in thickness of the tubular end piece adapted to be radially deformed outwards, at a determined distance from the bearing ring, so as to form the bead via enlargement.

4. A device according to claim 1, wherein the tubular end piece is cylindrical and screwed onto the proximal end of the pulling threaded rod.

5. A device according to claim 4, wherein the sheath has an outer diameter Df substantially equal to an outer diameter De1 of the tubular end piece.

6. A device according to claim 5, wherein the sheath is fitted, beyond the portion with a diameter Df, towards a distal end of the sheath, with a shoulder intended to be supported on an inner side of an end of the ring, said shoulder being perforated with multiple radial orifices to provide a translation locking system for locking the sheath in translation with regard to the pulling threaded rod.

7. A device according to claim 6, wherein the translation locking system comprises balls working with a ring-shaped groove made within the pulling threaded rod and with a diameter substantially equal to the outer diameter Df3 of the sheath measured at its distal end and reduced by approximately once the diameter of the balls so that the balls can retract within the groove without exceeding said diameter Df3.

8. A device according to claim 7, wherein the ring-shaped groove has a distal edge comprising a conical chamfer for guiding the radial movement of the balls during entrance/exit of the balls from said groove under axial displacement of the pulling rod.

9. A device according to claim 6, wherein the translation locking system is formed from a split ring connected to the sheath and comprising multiple segments separated by divisions so as to form radially elastic splines, the ends of which having pseudo-toric shaped radial outgrowths capable of retracting into the circular channel.

10. A device according to claim 9, wherein the circular channel comprises a distal edge having a conical chamfer for guiding the radial movement of the ends of the split ring during split ends entrance/exit from the circular channel under axial displacement of the pulling threaded rod.

11. A device according to claim 4, wherein the sheath has, over the majority of a length of the sheath, an outer diameter Df adapted for sliding within a circular orifice made in the bearing ring.

12. A device according to claim 1, wherein the sheath has an axial internal bore, polygonal in shape adapted to work in close collaboration with a corresponding polygonal shape made on an outer distal portion of the tubular end piece so as to lock the tubular end piece in rotation with respect to said sheath.

13. A device according to claim 1, wherein the tubular end piece has an open end comprising an outer chamfer for working with a corresponding conical chamfer fitted at the proximal end of the sheath.

14. A device according to claim 1, wherein the tubular end piece has a closed proximal end and an inner thread for working with an outer thread produced on the proximal end of the pulling rod.

15. A device according to claim 1, comprising a screwing driver mounted at the distal end of the pulling threaded rod so as to slide the pulling threaded rod axially during the formation of the radial bead.

16. A device according to claim 15, wherein the driver is formed from a hollow cylindrical part perforated through and through with an axial orifice equipped, at a proximal end, with an inner thread for working with an outer thread of the pulling threaded rod.

17. A device according to claim 16, wherein the axial orifice of the driver also comprises an inner shoulder with a larger diameter than the diameter of the thread so as to act as a bearing surface to a stop screw set within a threaded inner orifice made at the distal end of the pulling rod.

18. A device according to claim 17, wherein the axial orifice of the driver has a distal end forming a cylindrical bore whose inner diameter is larger than the diameter of the inner thread so that the locking screw can be inserted by this housing.

19. A device according to claim 1, wherein the hollow body has a proximal end comprising an outer thread working with an inner thread of the bearing ring.

20. A device according to claim 1, wherein the hollow body comprises a proximal end forming an inner recess with a radiating base.

21. A device according to claim 1, wherein the hollow body comprises a proximal end forming a cylindrical inner recess with a flat base and suitable for receiving a removable interchangeable wearing ring with a radiating base.

22. A device according to claim 1, comprising sealing means born by the bearing ring, the sealing means being an O-ring housed within an inner ring-shaped groove.

23. A device according to claim 1, comprising, within the hollow body, a compressible member acting as a compression spring.

24. A device according to claim 23 wherein the compressible member is supported against an inner shoulder of the hollow body on the one hand, and the proximal end of the driver on the other hand.

25. A temporary fastening method for preassembling at least two structural members previously formed with coaxial bores and implementing a device according to claim 1, the method comprising the steps of:

producing tightening means for tightening the structural members in the form of a radial bead, at a distance from said structural members;

and bringing the bead into contact with said structural members.

26. A method according to claim 25, wherein the bead is produced on a tubular end piece adapted to be mounted in a removable manner onto a pulling rod of the device and equipped with a mechanically weakened area, becoming radially deformed by enlargement to form said bead.

* * * * *